United States Patent
Hoang et al.

[19]

[11] Patent Number: 6,053,369
[45] Date of Patent: Apr. 25, 2000

[54] FOAM FORMING LIQUID DISPENSING DEVICE

[75] Inventors: Minh Quang Hoang, Taylorsville; Jonathan Karl Burkholz, Salt Lake City; Donald Edward Hunt, Provo, all of Utah

[73] Assignee: Becton Dickinson and Company, Franklin Lakes, N.J.

[21] Appl. No.: 09/161,815

[22] Filed: Sep. 28, 1998

[51] Int. Cl.[7] ....................................................... B67D 5/58
[52] U.S. Cl. ...................... 222/190; 222/153.14; 222/564
[58] Field of Search .................................... 222/179, 190, 222/564, 153.14

[56] References Cited

U.S. PATENT DOCUMENTS

| | | | |
|---|---|---|---|
| 4,281,778 | 8/1981 | Stull | 222/153.14 |
| 4,957,218 | 9/1990 | Ford, Jr. | 221/464 |
| 5,222,633 | 6/1993 | Blake | 222/179 |
| 5,269,444 | 12/1993 | Wright | 222/190 |
| 5,411,177 | 5/1995 | Blake, III | 222/190 |
| 5,725,129 | 3/1998 | Chapin et al. | 222/190 |

*Primary Examiner*—Philippe Derakshani
*Attorney, Agent, or Firm*—Arthur D. Dawson; Scott S. Servilla

[57] ABSTRACT

A foam dispensing apparatus of the present invention includes a reservoir containing a foamable liquid, with a closed headspace above a surface of the liquid. The apparatus also includes a source of a gas disposed to impose a gas pressure higher than ambient atmospheric pressure into the closed headspace. There is a mixing chamber having an inside diameter, an inlet and an outlet open to the ambient atmosphere with a flow restricter having a plurality of openings therein in gaseous communication with the closed headspace. The flow restricter is positioned at the inlet of the mixing chamber and an elongate delivery tube with an open passageway therethrough that defines a longitudinal axis extending from the inlet of the mixing chamber to below the surface of the foamable liquid disposed so that an application of the gas having higher pressure than atmospheric pressure to the headspace causes the foamable liquid to flow through the tube past the flow restricter, to mix with the headspace gas having higher pressure than atmospheric pressure that flows from the openings in the flow restricter and then to expand to atmospheric pressure in the mixing chamber thereby to form a foam from the foamable liquid and discharge the foam from the outlet.

12 Claims, 6 Drawing Sheets

FOAM FORMING LIQUID DISPENSING DEVICE

FIELD OF INVENTION

The present invention is generally related to liquid dispensing devices and more particularly to a dispenser that forms a foam from the liquid being dispensed.

BACKGROUND

In the field of dispensable liquid cleaning and disinfecting substances, a wide range of liquids are used. Many of these liquids evolved from the use of soap and detergent bars for handwashing. Bar soaps are economical, long lasting and an effective way to dispense small quantities of a sparingly soluble material, soap, for handwashing. Unfortunately, bar soaps, even when they contain an antimicrobial agent, are also excellent vehicles for transmission of microorganisms from one user to another.

One of the earliest widespread uses of liquid handwashing compounds was in hospital scrub environments. These handwashing compounds incorporated a variety of antibacterial agents for use in surgical scrub protocols and hospital infection control procedures. The surfactant component of the compound serves to disperse the antimicrobial agents on the practitioner's skin with the water used for washing and to facilitate the removal by the wash water of materials on the skin surface that could harbor microorganisms.

In the surgical scrub application, the liquid handwashing products serve primarily as a delivery system for delivery of antimicrobial agents onto the practitioner's skin so that microorganisms are removed or rendered non-viable. Many of these liquid antimicrobial agents are not particularly water soluble. Thus if a large droplet of a not particularly easily dispersible handwashing liquid is dispensed, considerable effort is required to distribute the agent over the practitioner's skin. To facilitate the practitioner's use of these antimicrobial handwashing compounds, dispensing devices that form a foam from the liquids were developed. When foamed, most of these handwashing compounds are significantly more easily dispersed in manual handwashing than the same compound in the liquid, unfoamed, state, because by being foamed, the surface area of the material is greatly increased. There are other benefits of foamed compounds: a) since the compound is readily dispersed, practitioners tend to use significantly less of the product while accomplishing the same desired effect of the surgical scrub procedure; and less water is needed to disperse the compound, the effective concentration of the antimicrobial compounds on the skin is likely higher than with the same liquid in a non-foamed state. A variety of different antimicrobial handwashing compounds are now available with many different types of antimicrobial agents. The physical attributes of these antimicrobial handwashing compounds vary from materials with viscosities not much higher than water, i.e. about five to about thirty-five centipoise (cps), to viscosities similar to motor oil or hand lotions, i.e. up to about one hundred cps, and up to about one thousand six hundred, similar to a cream.

U.S. Pat. No. 4,957,218 to Ford discloses a foam dispenser that utilizes manually created negative air pressure to fill a pump from a larger container with a foamable liquid and manually created positive air pressure to displace the liquid into a mixing chamber where a foam is formed from mixing the air and the liquid. The device disclosed in this patent is effective with low viscosity (ca. five to about thirty-five cps) liquids as a substrate, but with more viscous liquids (ca. about fifty to about one hundred cps), the foam produced is low density, i.e. high air content, and perceived as "dry" by users.

Another U.S. Pat. No. 5,411,177 to Blake discloses a foam dispensing apparatus that includes a liquid container and a foam generating device. The foam generating device has a plurality of passages through which pressurized gas flows simultaneously with foamable liquid into the foam generating chamber past a flow restricter. Again, the device disclosed in this patent produces acceptable foam with low viscosity liquids. Liquids having a viscosity greater than about twenty cps are not well dispensed by the device described in this patent.

If a foam dispensing device were available that was capable of forming acceptable foam with handwashing antimicrobial liquids over a range of viscosities, the efficiency of use of these handwashing compounds in hospital infection control protocols and other applications would be advanced. Such a device is disclosed hereinbelow.

SUMMARY

A foam dispensing apparatus of the present invention includes a reservoir containing a foamable liquid, with a closed headspace above a surface of the liquid. The apparatus also includes a source of a gas disposed to impose a gas pressure higher than ambient atmospheric pressure into said closed headspace. There is a mixing chamber having an inside diameter, an inlet and an outlet open to the ambient atmosphere with a flow restricter having a plurality of openings therein in gaseous communication with the closed headspace. The flow restricter is positioned at the inlet of the mixing chamber and an elongate delivery tube with an open passageway therethrough that defines a longitudinal axis extending from the inlet of the mixing chamber to below the surface of the foamable liquid disposed so that an application of the gas having higher pressure than atmospheric pressure to the headspace causes the foamable liquid to flow through the tube past the flow restricter, to mix with the headspace gas having higher pressure than atmospheric pressure that flows from the openings in the flow restricter and then to expand to atmospheric pressure in the mixing chamber thereby to form a foam from the foamable liquid and discharge the foam from the outlet.

The foam dispensing apparatus of the invention is capable of forming acceptable foam from foamable liquids with viscosities ranging from about five to about one hundred cps. The device is simple to manufacture and easy to use.

DETAILED DESCRIPTION

Figure 1:
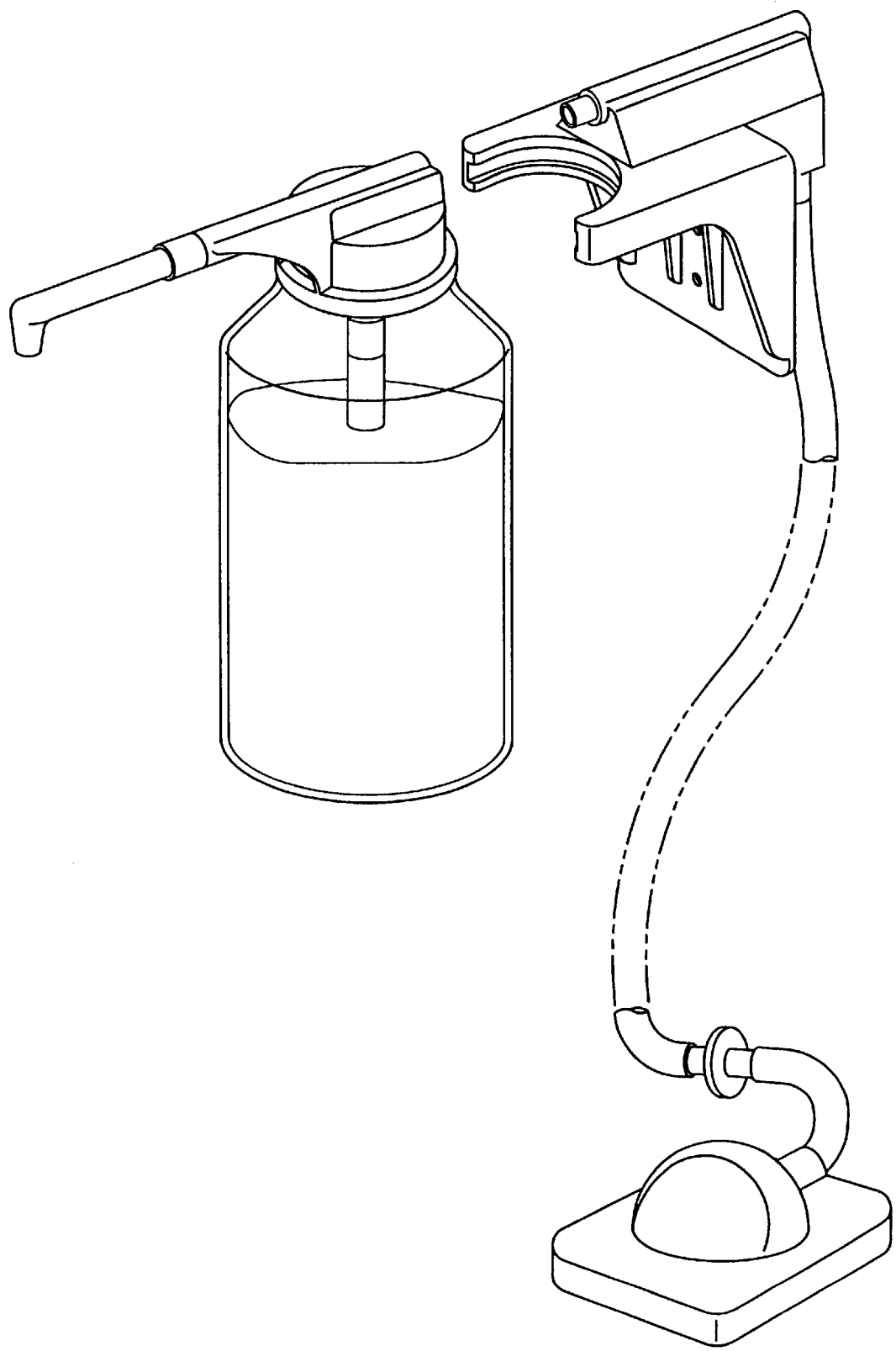
FIG. 1 is a partially exploded perspective view of the foam dispensing apparatus of the present invention.
Figure 2:
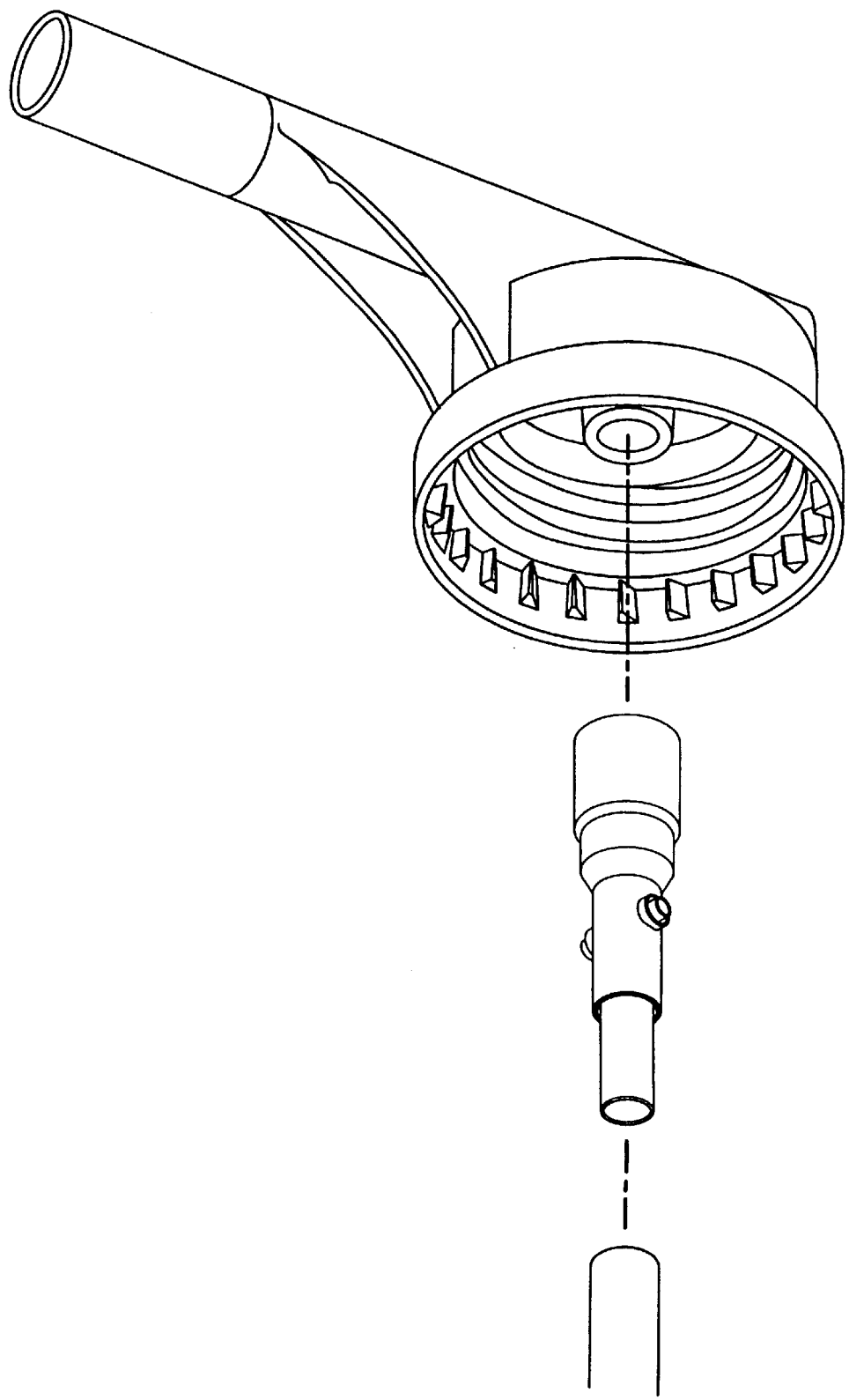
FIG. 2 is an exploded perspective view of the top portion of the apparatus of FIG. 1.

While this invention is satisfied by embodiments in many different forms, there is shown in the drawings and herein described in detail preferred embodiments of the invention with the understanding that the present disclosure is to be considered exemplary of the principles of the invention and is not intended to limit the invention to the embodiments illustrated. The scope of the invention is measured by the appended claims and their equivalents.

Referring to FIGS. 1–6, a foam dispensing apparatus 10 of the present invention includes a reservoir 12 containing a foamable liquid 14, with a closed headspace 16 above a surface 18 of liquid 14. Apparatus 10 also includes a source 20 of a gas disposed to impose a gas pressure higher than ambient atmospheric pressure into closed headspace 16. There is a mixing chamber 22 having an inside diameter "a", an inlet 24 and an outlet 26 open to the ambient atmosphere with a first flow restricter 28 having at least one opening 30 therein in gaseous communication with closed headspace16. Flow restricter 28 is positioned at inlet 24 of mixing chamber 22 and an elongate delivery tube 32 with an open passageway 34 therethrough that defines a longitudinal axis "A" extending from inlet 24 of mixing chamber 22 to below surface 18 of foamable liquid 14. Delivery tube 32 is disposed so that an application of the gas having higher pressure than atmospheric pressure to headspace 16 causes foamable liquid 14 to flow through tube 32 past flow restricter 28, to mix with the headspace gas having higher pressure than atmospheric pressure that flows from at least one opening 30 in flow restricter 28. The passage at inlet 24 with flow restricter 28 has a clearance "b" which is substantially smaller than diameter "a" of mixing chamber 22. The headspace gas mixed with liquid 14 then expands to atmospheric pressure in the larger diameter mixing chamber 22 thereby to form a foam from the foamable liquid and discharge the foam from outlet 26.

Figure 3:
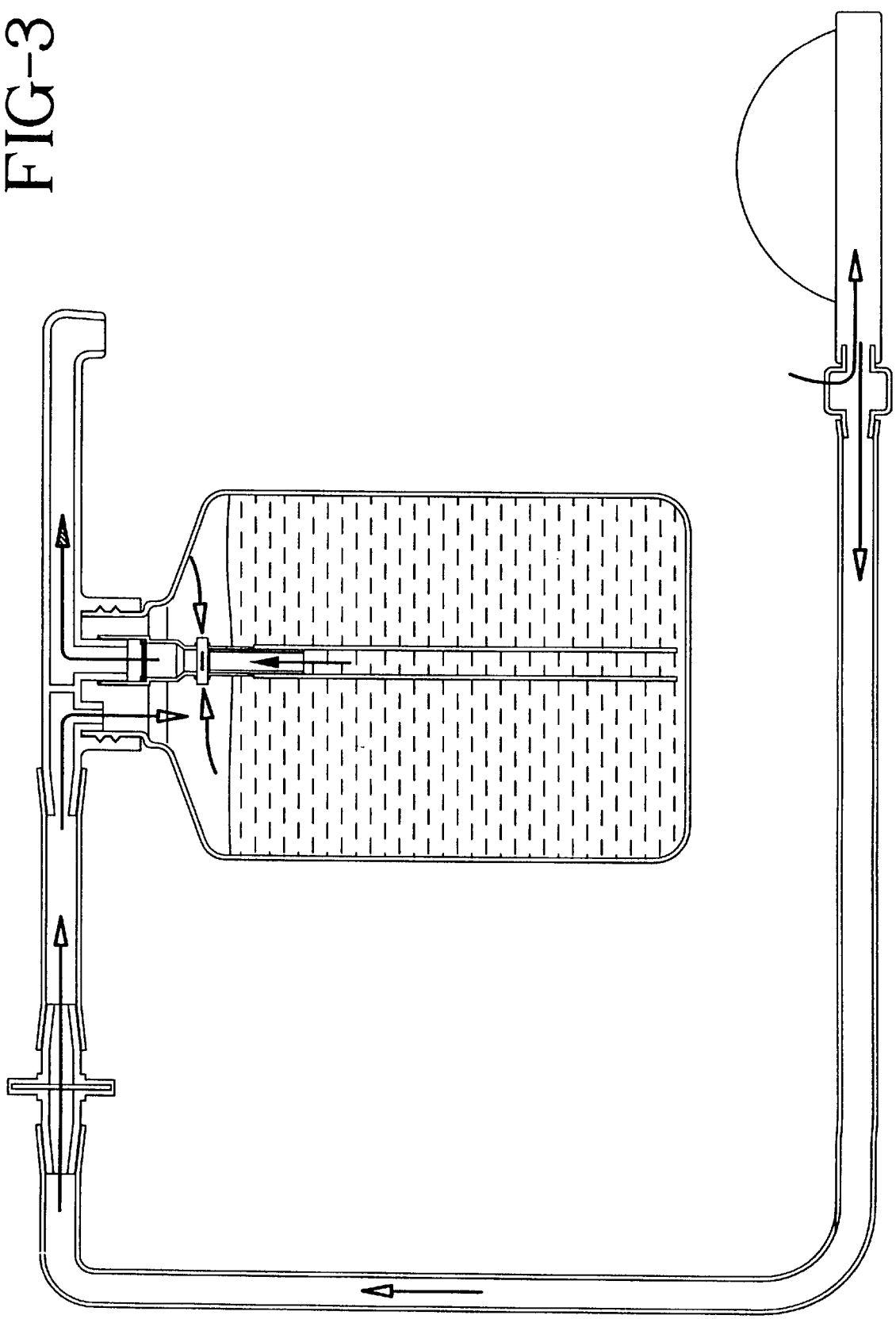
FIG. 3 is a schematic view of the apparatus of FIG. 1.

In the preferred embodiment as illustrated in FIGS. 1 and 3, the gas with pressure higher than atmospheric pressure is supplied from user controlled pressure source 20. Preferably the higher pressure gas is air, supplied by a manual pump or the like, here illustrated as a foot pump 21. For particular applications, any other substantially inert gas such as nitrogen, carbon dioxide or the like may be preferred and are considered within the scope of the invention. Preferably a delivery line 36 transmitting the air from to device 10 includes a check valve 37 and a filter 38 that is adequate to prevent introduction of foreign matter and microorganisms into reservoir 12.

First flow restricter 28 has at least one end 29 open into headspace 16 of container 12, and is disposed across longitudinal axis "A" of delivery tube 32 and sized so that at least a portion of passageway 34 of delivery tube 32 is occluded by first flow restricter 28 thereby to restrict flow of liquid 14 into mixing chamber 22. Preferably, first flow restricter 28 is substantially tubular with two open ends 29, a plurality of openings 30 and is disposed substantially perpendicularly across axis "A" at inlet 24.

Figure 4:
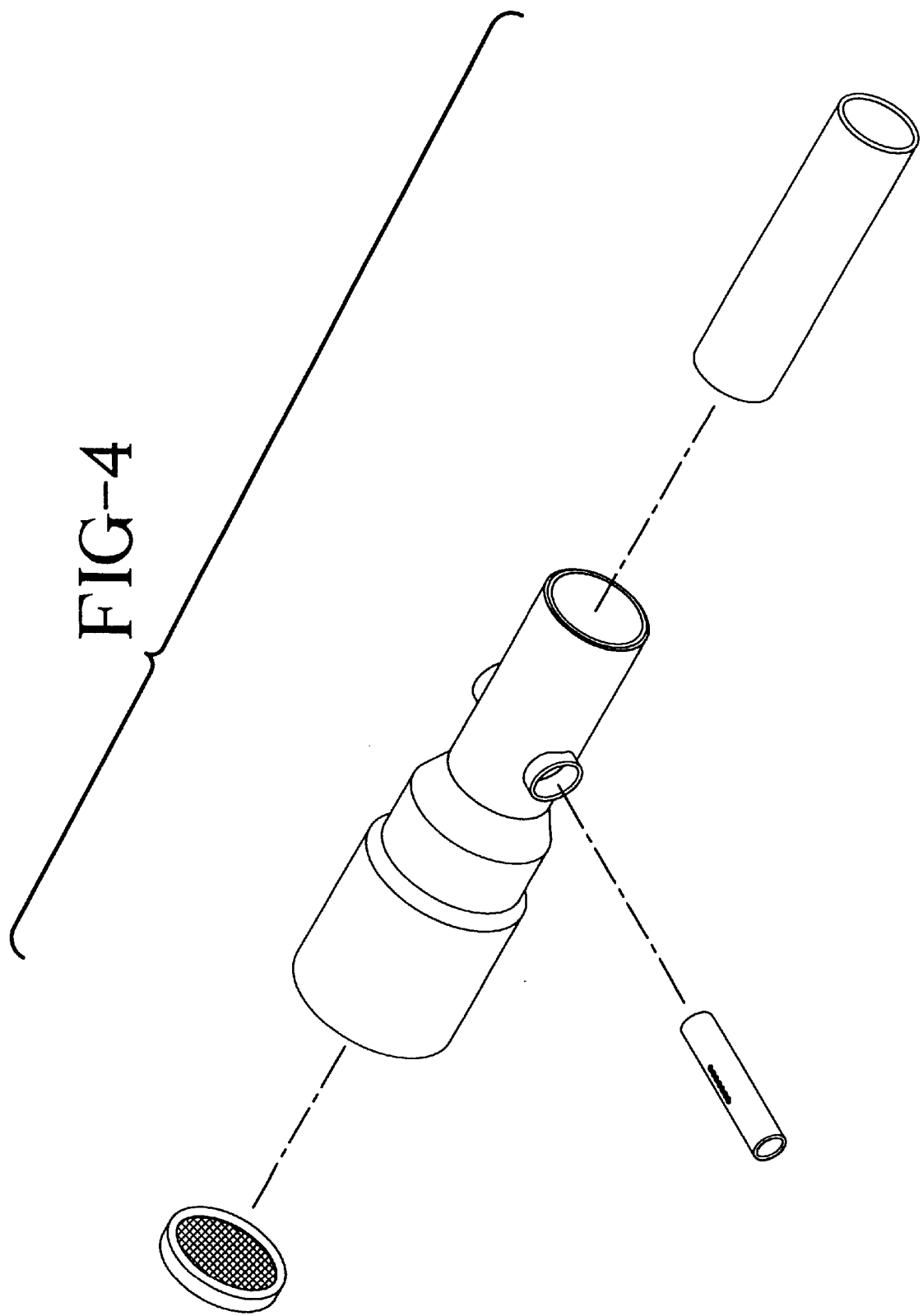
FIG. 4 is an exploded perspective view of a portion of the apparatus of FIG. 1.

Referring to FIG. 4, several variations of first flow restricter 28 are illustrated. In these alternatives, similar components that perform substantially similar functions are numbered identically to those components of the preferred first flow restricter with the exception that letter suffixes are added. Additional equivalent flow restricters with at least one opening may be envisioned by one skilled in the art after study of this disclosure. These equivalents are considered within the scope of the disclosure.

An alternative first flow restricter 28a is substantially tubular with a plurality of passages 31 at open ends 29a leading to a plurality of openings 30a. Flow restricter 28a is disposed substantially perpendicularly across axis "A" at inlet 24. Another alternate first flow restricter 28b is substantially tubular with two open ends 29a, at least one elongate slit opening 30b. Flow restricter 28b is disposed substantially perpendicularly across axis "A" at inlet 24. In this embodiment, flow restricter 28b is preferably formed from a resilient material so that as the headspace pressure is increase relative to atmospheric pressure elongate slit opening 30b may enlarge.

Preferably, mixing chamber 22 further includes a secondary flow restricter 40 at outlet 26. Secondary restricter 40 serves to limit or modulate the expansion of bubbles formed as foamable liquid 14 having the higher pressure gas mixed therein expands to atmospheric pressure. Preferably, secondary restricter 40 is formed of a polymeric material in the form of a screen with a pore size about twenty to about one hundred microns. A polymeric material with a pore size of about forty to about sixty microns is most preferred. Other materials suitable for forming flow restricter 40 include, but are not limited to, stainless steel screen and non-wovens. Suitable materials for forming flow restricter 40 are available from Tetko, Briarcliff Manor, N.Y. as Nitex Nylon 3-60/45 and Pecap Polyester 7-51/36 and Saatitech, Inc. as polyester PES 41/28. The incorporation of secondary restricter 40 into device 10 provides the device with the ability to form acceptable foam from foamable liquids with viscosities as low as about five centipoise (cps) and as high as about 100 cps.

Figure 5:
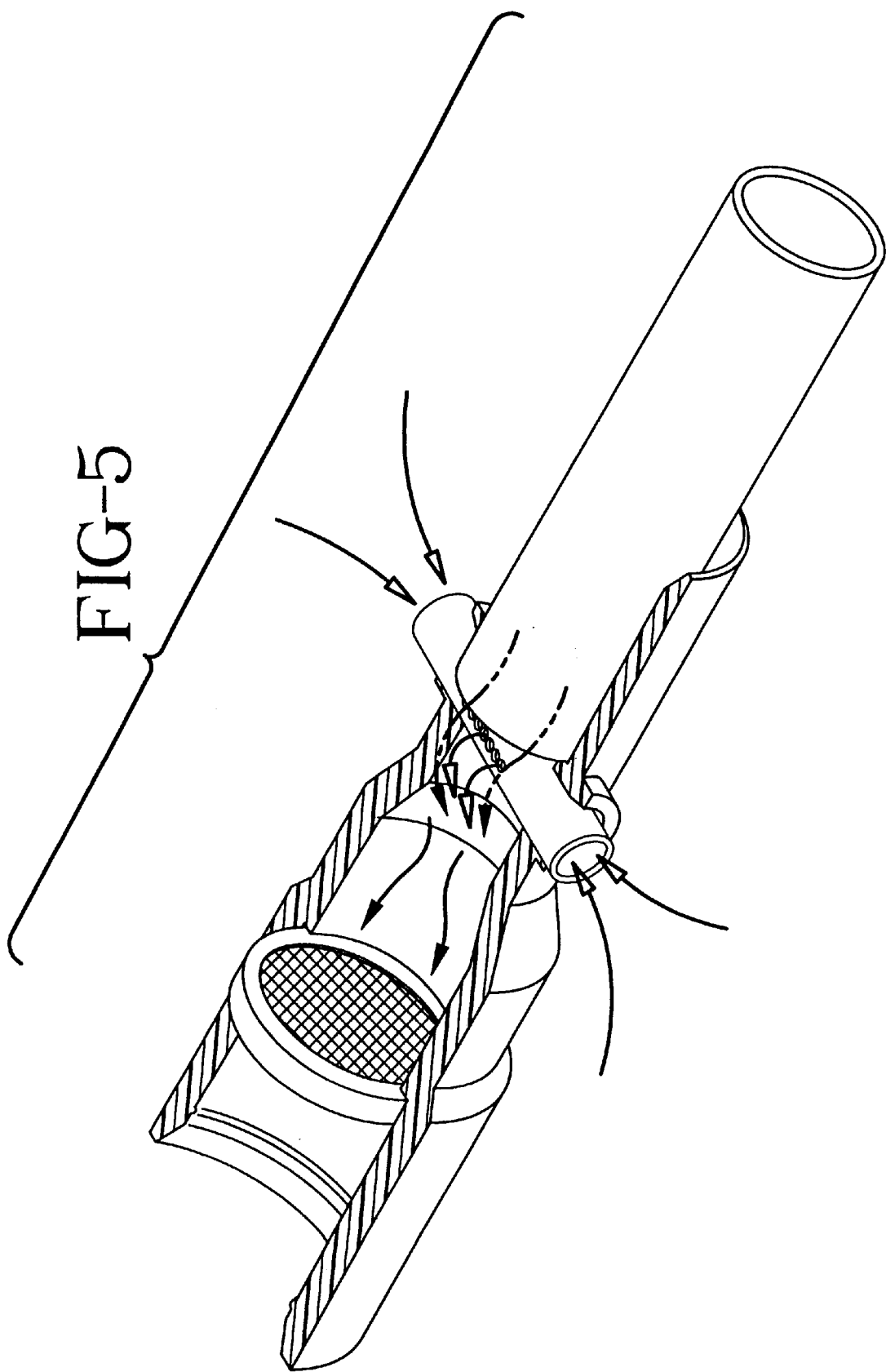
FIG. 5 is a partial cut-away perspective view of a portion of the apparatus of FIG. 1.
Figure 6:
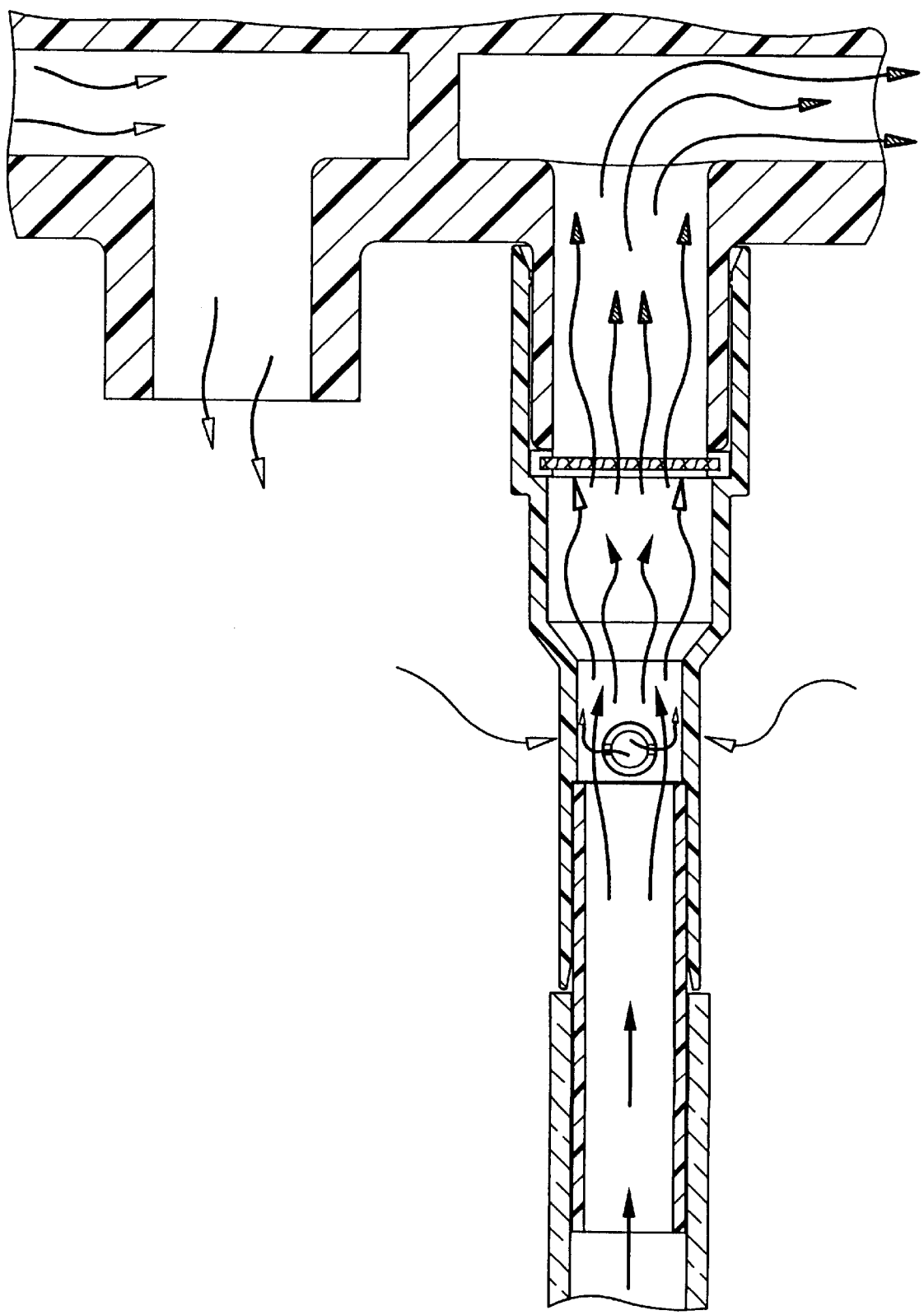
FIG. 6 is a schematic cross-sectional view of the top portion of the apparatus of FIG. 1.

Referring particularly to FIGS. 3, 5 and 6, liquid 14, represented by the solid arrows, is transported into mixing chamber 22 through delivery tube 32 and is mixed with the higher pressure gas from the headspace through openings 30 in flow restricter 28, represented by the open head arrows, expansion of the higher pressure gas occurs and foam, as represented by the cross hatch arrows, is formed. Secondary flow restricter 40 acquires of a coating of the liquid as the foam flows through it. When the liquid is not particularly viscous, i.e., five to about twenty, or not much more than water, not much head space pressure is required to move the liquid through delivery tube 32 into mixing chamber 22. As the viscosity of the foamable liquid increases, greater headspace pressure is required to move the liquid. The higher headspace pressure results in higher pressure gas being introduced into the liquid through openings 30 at flow restricter 28. When this higher pressure gas expands in volume to atmospheric pressure, the density of the foam produced in the mixing chamber decreases, producing a foam perceived by users as "dry" or "airy". The ability of secondary restricter 40 to acquire a coating of the liquid reduces the foam transmission to outlet by being partially occluded. The partial occlusion of secondary restricter 40 by the liquid causes a secondary pressure differential between an interior 42 of mixing chamber 22 as defined by secondary restricter 40 and atmospheric pressure causing a secondary controlled foaming on an atmospheric side 44 of flow restricter 40 resulting in a more uniform and user acceptable foam. In the case of the lower viscosity liquids, secondary restricter 40 does not acquire as substantial coating of the liquid, and pressure required to move the less viscous liquid is lower, while in the case of the higher viscosity liquids, more coating is acquired at secondary restricter 40, occluding the passage and providing the higher headspace pressure required to move the liquid and additionally providing a greater secondary control effect on the foaming at the atmospheric side 44 of the secondary restricter. This allows foam dispensing apparatus 10 to provide acceptable foam with a greater range of viscosities than other commercially available foaming apparatus disclosed in earlier patents.

A series of comparisons was performed between commercially available foam generation devices manufactured under U.S. Pat. Nos. 4,957,218 and 5,222,633 and foam generation apparatus 10 of the invention. Each of the foam generation devices was tested with a series of commercially available liquids having viscosities between 5 cps and 1625 cps. The foam was evaluated by weight, volume produced per cycle and for foam quality against a subject scale ranging from 0 to 4. The results of this comparison are given below in Tables 1, 2 and 3. The results show that foam generation device 10 of the invention was rated as providing good or excellent foam in seven out of twelve trials with foamable liquids ranging in viscosity from five to one thousand six hundred twenty-five centipoise. Under similar test conditions, the device produced according to U.S. Pat. No. 5,222,633 rated good or excellent in only 5 of 12 trials and the device produced under U.S. Pat. No. 4,957,218 was rated good or excellent in only 2 of 12 trials.

| Foam Quality | | | Acceptance Criteria | |
|---|---|---|---|---|
| | | | minimum | maximum |
| No Foaming | 0 | Worst | Foam Factor | 5 | 10 |

| Foam Quality | | | Acceptance Criteria | |
|---|---|---|---|---|
| | | | minimum | maximum |
| Poor | 1 | | Weight per pump (g) | 2 | 7 |
| Okay | 2 | | | | |
| Good | 3 | | Foam Quality | 3 | 4 |
| Excellent | 4 | Best | | | |

TABLE I

DEVICE 10

| Solution | 5 pump Weight, g | 6 pump Volumne, ml | Foam Factor, ml/g | Weight per pump, g | Viscosity CPS | Foam Quality | | Comments |
|---|---|---|---|---|---|---|---|---|
| A | 7.10 | 55.00 | 7.75 | 1.42 | 765 | Okay | 2 | Decent foam, however a little sputtery. |
| B | 6.20 | 20.00 | 3.23 | 1.24 | 190 | Poor | 1 | Poor foaming. Very little discharge. |
| C | 4.40 | 40.00 | 9.09 | 0.88 | 80 | Good | 3 | Good foam, however a little sputtery with little discharge. |
| D | 17.40 | 160.00 | 9.20 | 3.48 | 35 | Excellent | 4 | Excellent foam with good delivery. Consistent foam. |
| E | 30.70 | 175.00 | 5.70 | 0.14 | 5 | Excellent | 4 | Excellent foam consistency. A little on the wet side. |
| F | 3.80 | 4.00 | 1.05 | 0.76 | 330 | Poor | 1 | Mostly liquid with a few large bubbles. |
| G | 19.20 | 120.00 | 6.25 | 3.84 | 8 | Good | 3 | Good foam consistency, however, a little wet. |
| H | 22.40 | 160.00 | 7.14 | 4.48 | 15 | Excellent | 4 | Excellent foam delivery and consistency. |
| I | 35.50 | 175.00 | 4.93 | 7.10 | 6 | Good | 3 | Good consistency, however, a little wet with some liquid. |
| J | 12.60 | 100.00 | 7.94 | 2.52 | 100 | Good | 3 | Decent foam, however a little sputtery and airy. |
| K | 6.90 | 60.00 | 8.70 | 1.38 | 765 | Okay | 2 | Fairly inconsistent. Too airy and sputtery. |
| L | 2.00 | 5.00 | 2.50 | 0.40 | 1625 | Poor | 1 | Minimal discharge. Sputtery. |

TABLE II

U.S. PAT. NO. 5,222,633

| Solution | 5 pump Weight, g | 6 pump Volumne, ml | Foam Factor, ml/g | Weight per pump, g | Viscosity CPS | Foam Quality | | Comments |
|---|---|---|---|---|---|---|---|---|
| A | 11.20 | 15.00 | 1.34 | 2.24 | 765 | Poor | 1 | Very little discharge. Too airy with all bubbles floating in the air. |
| B | 3.80 | 4.00 | 1.05 | 0.76 | 190 | No Foaming | 0 | Non foaming. Very little discharge. |
| C | 5.10 | 6.00 | 1.16 | 1.02 | 80 | Poor | 1 | Mostly liquid with a few large bubbles. |
| D | 12.60 | 25.00 | 1.66 | 2.52 | 35 | Poor | 1 | Mostly liquid with a few large bubbles. Very inconsistent. Sputtery. |
| E | 18.00 | 210.00 | 11.57 | 3.60 | 5 | Excellent | 4 | Consistent delivery and foam. A little too airy. |
| F | 1.40 | 1.50 | 1.07 | 0.26 | 330 | No Foaming | 0 | All liquid delivery. |
| G | 23.20 | 100.00 | 4.31 | 4.64 | 6 | Poor | 1 | Very inconsistent and sputtery. Mostly liquid with some foam. |
| H | 14.70 | 140.00 | 6.52 | 2.94 | 15 | Okay | 2 | Sputtery and inconsistent bubble siae. Too airy. |
| I | 19.10 | 253.00 | 13.09 | 2.62 | 5 | Excellent | 4 | Good consistency and delivery. |
| J | 21.20 | 125.00 | 5.90 | 1.24 | 100 | Okay | 2 | Fairly inconsistent. Some liquid. Too airy foam. |
| K | 12.70 | 30.00 | 2.36 | 2.54 | 765 | Poor | 1 | Poor consistency. Too airy and sputtery. |
| L | 4.80 | 5.00 | 1.04 | 0.66 | 1623 | No Foaming | 0 | Non foaming. Very little discharge. Sputtery. |

TABLE III

U.S. PAT. NO. 4,957,218

| Solution | 5 pump Weight, g | 6 pump Volumne, ml | Foam Factor, ml/g | Weight per pump, g | Viscosity CPS | Foam Quality | | Comments |
|---|---|---|---|---|---|---|---|---|
| A | 0.70 | 5.00 | 7.14 | 0.14 | 765 | Poor | 1 | Very little discharge. Foam okay. |

TABLE III-continued

U.S. PAT. NO. 4,957,218

| Solution | 5 pump Weight, g | 6 pump Volumne, ml | Foam Factor, ml/g | Weight per pump, g | Viscosity CPS | Foam Quality | Comments | |
|---|---|---|---|---|---|---|---|---|
| B | 0.50 | 1.00 | 2.00 | 0.10 | 190 | Poor | 1 | Very little discharge. Foam okay. |
| C | 0.80 | 5.00 | 8.28 | 0.16 | 80 | Poor | 1 | Very little discharge. Foam okay. |
| D | 3.40 | 80.00 | 23.53 | 0.68 | 35 | Good | 3 | Good foam, however, poor discharge. Sputtery. Inconsistent. Airy. |
| E | 9.00 | 150.00 | 16.67 | 1.80 | 5 | Excellent | 4 | Good foam delivery. Consistent. Little too airy. |
| F | 0.50 | 1.00 | 2.00 | 0.10 | 330 | Poor | 1 | Very little discharge. Foam okay. Sputtery. |
| G | 13.50 | 120.00 | 8.88 | 2.70 | 8 | Good | 7 | Nice foaming. A little inconsistent. Some liquid. |
| H | 7.60 | 150.00 | 19.74 | 1.52 | 15 | Good | 3 | Nice consistency. A little sputtery and airy. |
| I | 7.40 | 110.00 | 14.86 | 1.48 | 5 | Excellent | 4 | Good consistency and delivery. |
| J | 2.20 | 16.00 | 6.82 | 0.44 | 100 | Okay | 2 | Poor consistency. Too airy. |
| K | 2.30 | 5.00 | 2.17 | 0.46 | 786 | Poor | 1 | Poor discharge. Okay consistency. Sputtery. |
| L | 0.20 | 0.50 | 2.50 | 0.04 | 1625 | No Foaming | 9 | Minimal discharge. Sputtery. |

Referring again to FIG. 1, the preferred apparatus of the invention further includes a wall bracket 44 attachable to a substantially vertical wall surface or other suitable location for releasably holding apparatus 10. Wall bracket 44 also preferably includes one side 46 of a coupling 48 for supplying air to headspace 16 of reservoir 12. Apparatus 10 also includes a cap 50 that incorporates mixing chamber 22 and delivery tube 32 that forms a substantially gas tight seal with reservoir 12. Cap 50 preferably is sized and shaped to releasably engage wall bracket 44. Cap 50 also preferably includes a second side 52 of coupling 48 for supplying air to headspace 16 of the reservoir. Cap 50 preferably includes a one way latch, such as a ratchet 54, sized and shaped to engage a neck 56 of reservoir 12 so that once cap 50 is mounted on reservoir 12, the cap is substantially non-removable. The non-removablity of cap 50 thereby renders apparatus 10 suitable only for a single-use, i.e., the reservoir is substantially non-refillable. In use, wall bracket 44 including air delivery tube 36, check valve 37 and filter 38 would preferably be fixedly attached to the wall, with pump 21 positioned on the floor, and a pre-filled apparatus 10 mounted to the bracket. Once the foamable liquid in the reservoir was exhausted, apparatus 10 is removed from wall bracket 34 for suitable disposable and another prefilled apparatus mounted on bracket 44.

Preferably, cap 50 and bracket 44 are formed from thermoplastic materials such as polyvinylchloride, polycarbonate, polypropylene, polyethylene, acrylonitrile butadiene styrene copolymer (ABS), polyamide, polyester, polystyrene and the like. Flow restricter 28 may be formed from thermoplastic materials similar to cap 50 or alternatively from extruded resilient materials such as silicone elastomer and the like. Mixing chamber 22 may be formed from thermoplastic materials similar to those for cap 50. For particular applications, it may be advantageous to integrally form mixing chamber 22 and flow restricter 28 as a single injection molded thermoplastic article.

Apparatus 10 of the invention is simple to manufacture, easy to assembly and, based on the results of the comparison test provides a benefit to the art of foamed antimicrobial hand washing.

What is claimed is:

1. A foam dispensing apparatus comprising:
a reservoir containing a foamable liquid, said reservoir having a closed headspace above a surface of the liquid;
a source of a gas disposed to impose a gas pressure higher than ambient atmospheric pressure into said closed headspace;
a mixing chamber having an inside diameter, an inlet and an outlet open to the ambient atmosphere;
a first flow restricter in gaseous communication with said closed headspace, said first flow restricter being disposed at said inlet of said mixing chamber; and
an elongate delivery tube and an open passageway therethrough having a longitudinal axis extending from said inlet of said mixing chamber to below the surface of the foamable liquid disposed so that an application of the gas having higher pressure than atmospheric pressure to the headspace causes the liquid to flow through said tube past said first flow restricter and wherein the headspace gas having higher pressure than atmospheric pressure flows from said openings in said first flow restricter to mix with the foamable liquid and to expand to atmospheric pressure in said mixing chamber thereby to form a foam from the foamable liquid and discharge said foam from said outlet, wherein said first flow restricter is substantially tubular, has two open ends, a plurality of openings therein and is disposed substantially perpendicularly across said longitudinal axis of said delivery tube.

2. The apparatus of claim 1 wherein said mixing chamber further comprises a secondary flow restricter at said outlet of said mixing chamber, said secondary flow restricter to restrict the expansion of bubbles formed as said foamable liquid having said higher pressure gas mixed therein expands to atmospheric pressure.

3. The apparatus of claim 2 wherein said secondary flow restricter is formed from a single layer of a material selected from the group consisting of polymeric materials, non-woven materials and stainless steel.

4. The apparatus of claim 3, wherein said secondary flow restricter is formed from a screen formed from a polymeric material having a pore size between about twenty to about one hundred microns.

5. The apparatus of claim 1 wherein said first flow restricter has at least one end open into said headspace of said container, said first flow restricter being disposed across said longitudinal axis of said delivery tube and sized so that at least a portion of said passageway of said delivery tube is occluded by said flow restricter thereby to restrict flow of the liquid into said mixing chamber.

6. The apparatus of claim 1 wherein said gas having a higher pressure than atmospheric pressure is air.

7. The apparatus of claim 6 wherein said higher pressure air is supplied by a user activated pump system further comprising a filter disposed to substantially prevent introduction of foreign matter into said headspace of said reservoir.

8. The apparatus of claim 6 wherein said pump system further comprises a wall bracket attachable to a substantially vertical wall surface for releasably holding said apparatus, said wall bracket including one side of a coupling for supplying said higher pressure air to said headspace of said reservoir.

9. The apparatus of claim 8 wherein said mixing chamber and said delivery tube further comprises a cap for said reservoir including a second side of said coupling for releasably connecting said headspace of said reservoir to said wall bracket having said first side of said connector.

10. The apparatus of claim 9 wherein said cap further includes a dispensing tube affixed to said outlet of said mixing chamber for delivering the foam to a user.

11. The apparatus of claim 9 wherein said cap for said reservoir is disposed so that once said cap is affixed to said reservoir, said cap is substantially not removable, thereby rendering said reservoir single use.

12. A foam dispensing apparatus comprising:

a reservoir containing a foamable liquid, said reservoir having a closed headspace above a surface of the liquid;

a source of a gas disposed to impose a gas pressure higher than ambient atmospheric pressure into said closed headspace;

a mixing chamber having an inside diameter, an inlet and an outlet open to the ambient atmosphere;

a substantially tubular flow restricter having a plurality of openings therein in gaseous communication with said closed headspace, said flow restricter being disposed at said inlet of said mixing chamber, said mixing chamber further comprising a secondary flow restricter at said outlet of said mixing chamber, said secondary flow restricter to restrict the expansion of bubbles formed as said foamable liquid having said higher pressure gas mixed therein expands to atmospheric pressure; and an elongate delivery tube and an open passageway therethrough having a longitudinal axis extending from said inlet of said mixing chamber to below the surface of the foamable liquid disposed so that an application of the gas having higher pressure than atmospheric pressure to the headspace causes the liquid to flow through said tube past said flow restricter and wherein the headspace gas having higher pressure than atmospheric pressure flows from said openings in said flow restricter to mix with the foamable liquid and to expand to atmospheric pressure in said mixing chamber thereby to form a foam from the foamable liquid and discharge said foam from said outlet.

* * * * *